United States Patent [19]

Gerritsen et al.

[11] Patent Number: 4,656,343

[45] Date of Patent: Apr. 7, 1987

[54] METHOD AND APPARATUS FOR PROCESSING DOCUMENTS

[76] Inventors: Rudolf Gerritsen, R.R. 1, Box 24A, Kingston, Ill. 60145; Charles Kent, 4 Barr Rd., Rte. 1, Hampshire, Ill. 60140

[21] Appl. No.: 761,150

[22] Filed: Aug. 1, 1985

[51] Int. Cl.[4] .................................... G06K 7/10

[52] U.S. Cl. .................................... 235/454; 235/449

[58] Field of Search ................ 235/449, 454, 470, 475

[56] References Cited

U.S. PATENT DOCUMENTS 3,935,429 1/1976 Branecky .......................... 235/454

*Primary Examiner*—Harold I. Pitts

*Attorney, Agent, or Firm*—Lee, Smith & Zickert

[57] ABSTRACT

In an apparatus for processing and serially dispensing discrete groups of documents, a system for identifying and sequentially arranging a plurality of coded documents traveling in a stream. The documents are conveyed individually from a source to a release position and, during the time that they are being conveyed, they are scanned to determine the presence of a document and also to read code which appears on the document. That information is stored in a processor. Documents are retained or released at a document retention gate depending on the nature of the code read from the document. A document accumulator is spaced down stream from the retention gate and includes an accumulation gate and a scanner to determine presence of documents at the accumulation gate. Documents pass through the system and exit from the accumulation gate depending on the code from each document.

14 Claims, 4 Drawing Figures

METHOD AND APPARATUS FOR PROCESSING DOCUMENTS

BACKGROUND OF THE INVENTION

This invention relates to a method and apparatus for processing and serially dispensing discrete groups of documents, and in particular to a system for identifying and sequentially arranging a plurality of coded documents which are traveling in a stream in the apparatus.

Mass mailers, such as credit card companies, gasoline retailers, mass merchandise retailers, and the like, deal with massive quantities of documents which need to be sorted, folded, joined with other documents, and eventually inserted into envelopes and mailed. In order to automatically handle tasks which would take dozens of humans working at relatively slow rates, sorting and mailing equipment has been developed by many companies for automating the laborious and massive task.

The Phillipsburg Division of Bell & Howell Co. manufactures and sells an automated mailing line including a cutter or burster for separating computer generated coded documents, a folder for folding the documents, a sequencer for collating documents in the proper order, an inserter track where various desired inserts are added to the collated documents, and subsequent envelope stuffing and handling stations where documents are inserted within an envelope and the envelope is prepared for mailing. Handling of a document depends on the code carried by each document.

While such apparatus is essentially automated from document creation to application of postage to an envelope, one problem suffered by such equipment is a lack of high speed processing due to an inability to individually and rapidly handle documents after they are cut from computer generated forms. In such equipment, the documents are handled mechanically, with the location of the document being determined by the conveying speed in the burster. Coded information is read from a document while in the burster, and interpretation of the code is dependent entirely upon mechanical accuracy of location of the document in the burster. Thus, document speed must be slow and controlled. If the predetermined sequential relationships within the apparatus are inadvertently changed, proper document orientation can be disrupted, requiring a temporary shutdown of the equipment for readjustment to ensure proper sequencing.

SUMMARY OF THE INVENTION

The present invention overcomes the deficiencies of the prior art and others by providing, in an apparatus for processing and serially dispensing discrete groups of documents, a system for identifying and sequentially arranging a plurality of coded documents as they travel in a stream. Documents are read "on the fly" rather than when linked in a document burster. In accordance with the invention, the system includes a source of coded documents. Means is provided for conveying documents individually from the document source to a downstream document release position. During conveying of the documents, first scanner means is provided to determine the presence of a document. Second scanner means associated with the first scanner means then reads code from each document. Code read from the document is stored in a processor. At the document release position, a retention gate is provided to temporarily hold a document or release the document, depending on downstream conditions. A third scanner means is provided at the retention gate to determine the presence of a document at the gate. Downstream from the retention gate, a document accumulator is located and includes an accumulation gate and a fourth scanner means to determine the presence of a document at the accumulation gate.

Preferably, the system includes an encoding means for generating a pulse train. The encoding means is associated with the conveying means and generates pulses of the pulse train dependent on the velocity at which the conveying means conveys the coded documents. In accordance with the disclosed embodiment of the invention, the conveying means comprises a belt conveyor, and the encoding means is a rotary encoder attached to one of the rollers of the conveyor. A sensor is positioned adjacent the rotary encoder to detect code marks thereon and generate the pulses of the pulse train from the code marks. The spacing of the code marks corresponds to the spacing of the coding on each document so that pulses from the rotary encoder may coincide with code read from each document.

Normally, the code on the document consists of a series of individual bars spaced rectilinearly over a portion of each document. Some code, however, also includes two rectilinear code tracks. To accomodate such a double code, the invention incorporates a fifth scanner means adjacent the second scanner means to read the second track of code from the document.

All of the scanners and the gates are electronically connected to the processor. The processor includes means to activate the gates responsive to code read from a document and the presence or absence of documents at particular locations throughout the system.

In accordance with the preferred embodiment of the invention, the documents have a normal maximum length. The retention gate is spaced downstream from the first scanner means a distance at least as great as the maximum length of the documents. Thus, the document, if retained at the retention gate, is retained a sufficient distance from the first scanner means so that the first scanner means does not detect presence of the document as it is being retained.

Documents are handled in a serial fashion. When the system is initialized, a first document is conveyed from the document source onto the conveyor where the presence of the document is detected by the first scanner means and the code on the document is ready by the second scanner means. The document then progresses to and through the document release position, through a folder, if needed, and on to the document accumulator spaced downstream at least as far as the maximum length of a folded document. After the document passes the document release position, the third scanner means signals the processor, causing a second document to be released from the document source. Meanwhile, the first document is retained temporarily at the document accumulator.

The second document is processed in the same manner as the first. However, when the second document reaches the document release position, if the code read from the second document indicates that the first and second documents do not belong together (that is, they are not to be included in the same envelope), the second document is retained by the retention gate at the document release position. After the first document is ejected from the document accumulator, the second document is then released from the document release position and passes on to the document accumulator. The process continues in a similar fashion with documents which are desired to be joined in an envelope being accumulated at the document accumulator and then released onto an inserter track where other documents, such as advertisements and other envelope stuffers, may be added to the stack before all documents are inserted within an envelope and then processed for later mailing.

BRIEF DESCRIPTION OF THE DRAWINGS

The invention is described in greater detail in the following description of an example embodying the best mode of the invention, taken with the drawings, in which.

DESCRIPTION OF AN EXAMPLE EMBODYING THE BEST MODE OF THE INVENTION

Figure 1:
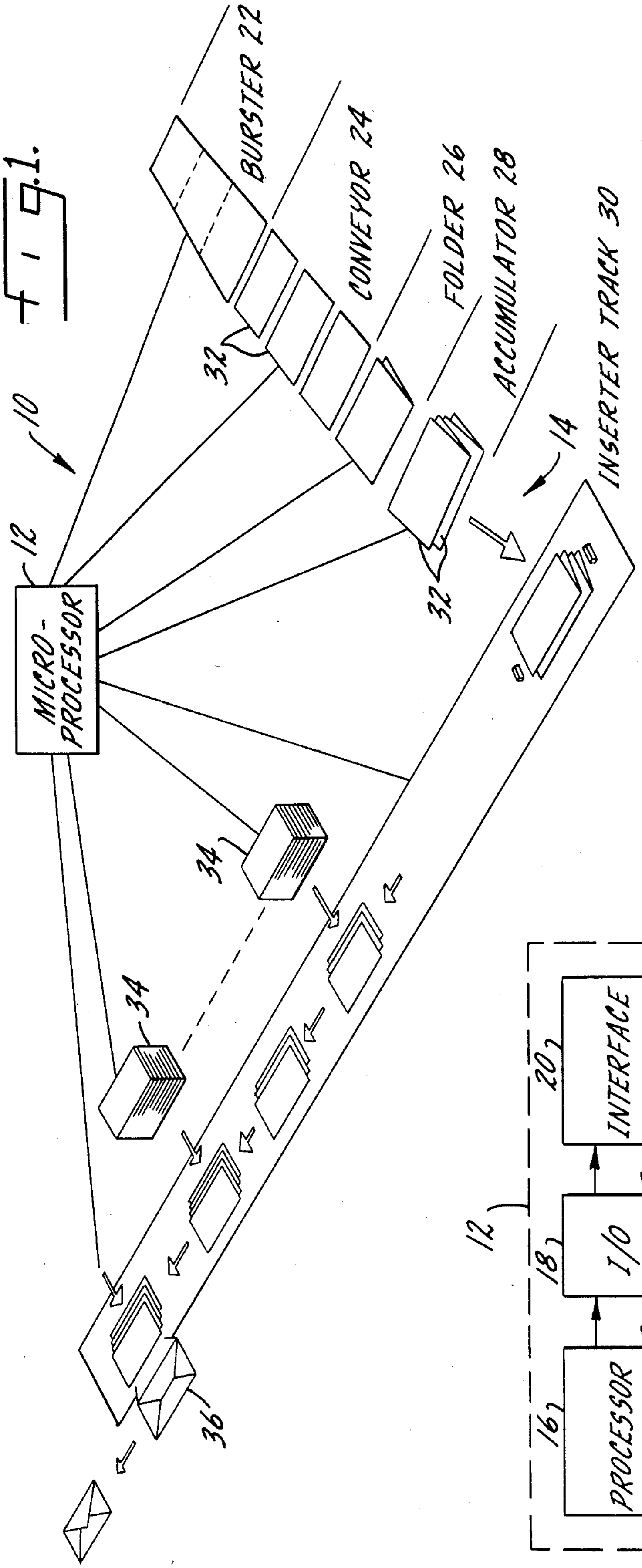
FIG. 1 is an overall schematic illustration of mail processing equipment including stations from document separation to envelope stuffing and sealing, including the novel additions of the present invention.

A mail processing system is shown generally at 10 in the drawing figures. As primary elements, the system 10 includes a micro processor 12 and an inserter system 14.

Figure 2:
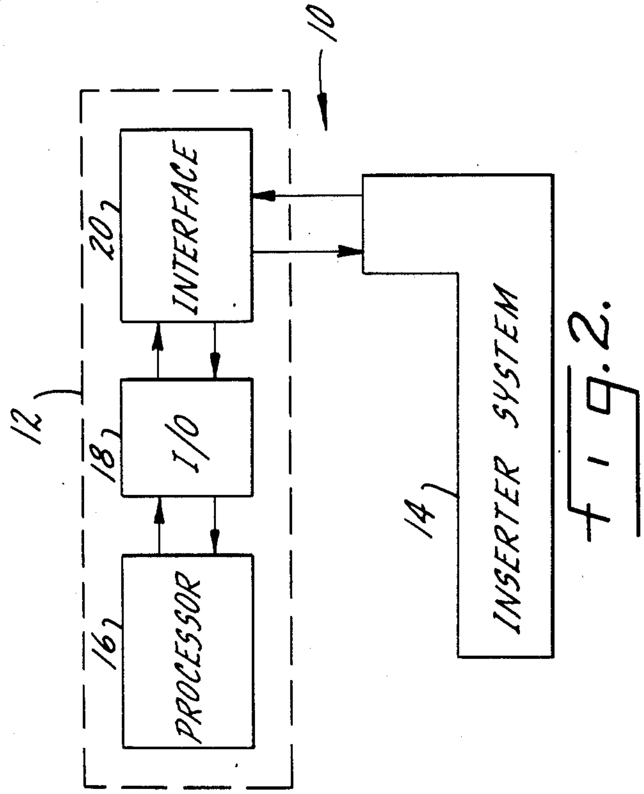
FIG. 2 is a block diagram similar in concept to FIG. 1, but showing the various stations together as an inserter system and showing various basic elements of the micro processor for controlling operation of the system.

As best shown in FIG. 1, the micro processor 12 is arranged to control each of the elements of the inserter system 14, as described in further detail below. The micro processor 12 maybe a conventional micro computer which is programmed to produce the functions and results described below, or maybe a specially constructed device to produce the same results. In block form in FIG. 2, the micro processor 12 is composed of a main processor 16, an input and output control 18, and an interface 20 for properly interfacing information as it is sent to and from the micro processor 12. As an example of the components of the micro processor 12, the applicants have employed an MP-09 micro processor board manufactured by Southwest Technical Products Corporation as the processor 16. The input/output 18 has been configured employing an SS-50 parallel I/O card of Thomas Instrumentation, Avalon, N.J. It will be apparent that controlling the various functions described below and proper interfacing with the means of controlling can be done in many fashions.

Returning to FIG. 1, the various portions of the inserter system 14 are shown in a schematic fashion. The basic portions of the inserter system 14 include a burster 22, a conveyor 24, a document folder 26, an accumulator 28, and an inserter track 30. Each of the elements 22 through 30 is controlled by the micro processor 12.

At the burster 22, documents are cut or separated from a computer stream into discrete, individual documents 32. The documents 32 are conveyed serially from the burster 22 by the conveyor 24, where the documents are detected and the code thereon is read, with all information being directed to the micro processor 12. From the conveyor 24, the documents 32 proceed to the folder 26 where they are folded and then sent to the accumulator 28, where one or more documents is accumulated depending on the code read from the documents. After the desired number of documents is accumulated at the accumulator 28, the documents are ejected onto the inserter track 30 where they are conveyed and additional inserts from stacks 34, are added from one or more insert stations. Not all inserts need be added to each group of documents, and the particular inserts are selected in response to the code read from the documents. At the end of the inserter track 30, each set of documents is inserted into an envelope 36 which is then subsequentially sealed, postage is applied, and the envelopes are then grouped for mailing in order to enjoy the lowest possible mailing cost.

With the exception of additions discussed below, the burster 22, folder 26, accumulator 28 and inserter track 30 are conventional, such as those manufactured by the Phillipsburg Division of Bell & Howell Corporation, and are not discussed in any greater detail. It should be evident that many different types of conventional apparatus may be employed to fulfill the functions of these elements.

Figure 3:
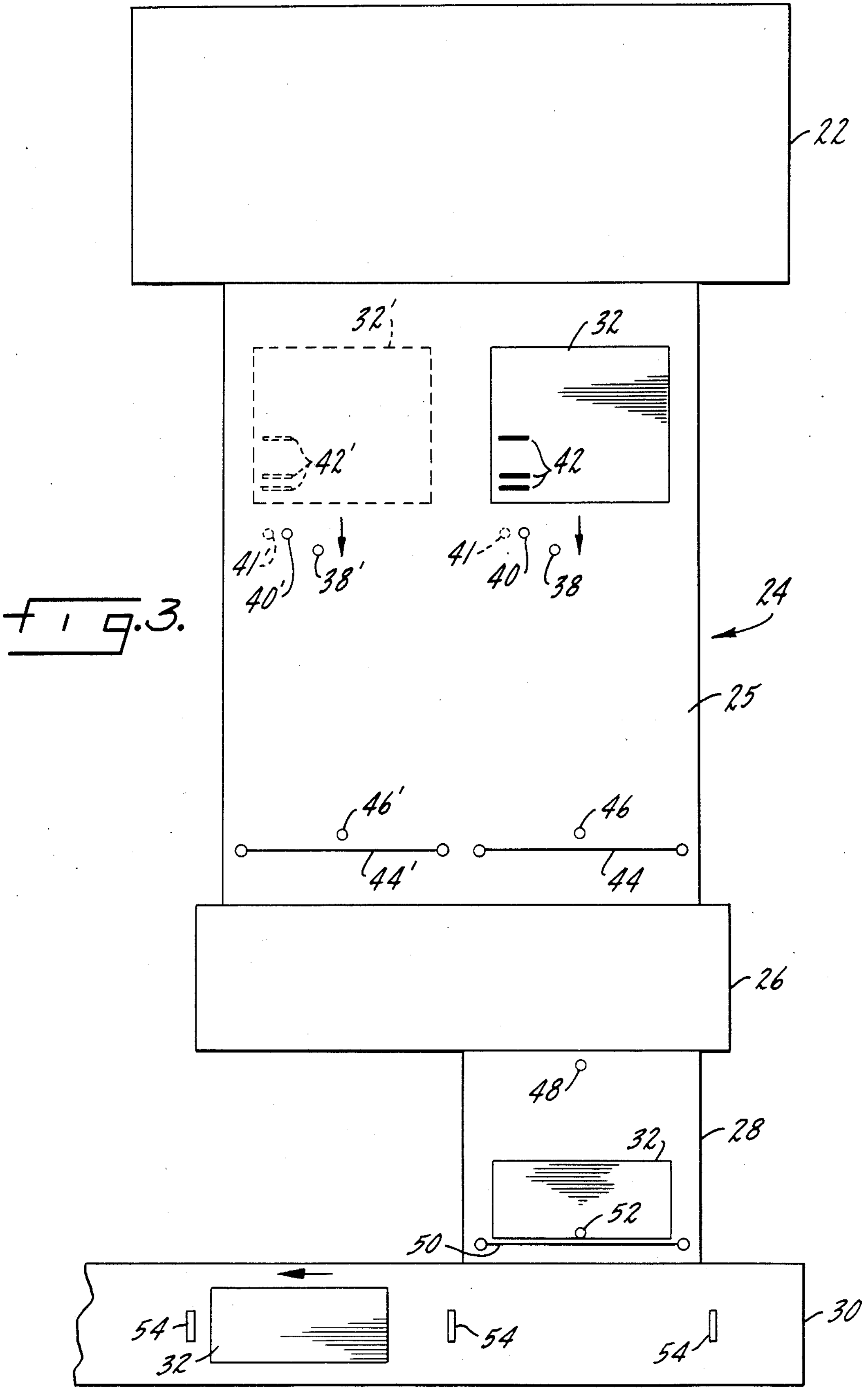
FIG. 3 illustrates the document conveying, identifying and arranging portion of the invention.

With reference to FIG. 3, the conveyor 24 may be comprised of a conventional belt conveyor 25 driven by an electric motor (not illustrated). The conveyor 24 includes a first scanner 38, which may be a fiber optic scanner, which is positioned to determine the presence of a document 32 on the belt 25. A second scanner 40 is positioned to read code marks 42 from the document 32 as the document 32 is conveyed on the conveyor 24. If double tracks of code marks 42 are applied to the document 32, an additional scanner 41 is employed in line with the second string of code marks.

A retention gate 44 is positioned at the location where a document is released from the conveyor 24. The gate 44 is operated by the micro processor 12 at one of two orientations, a document hold orientation where the document is retained temporarily, and a document release orientation where the document is released to the folder 26. A scanner 46 is located at the retention gate 44 to determine the presence of a document 32 at the gate 44. The gate 44 and scanner 46 are located downstream from the scanner 38 sufficiently so that when a document is retained at the gate 44, it is no longer in position to be detected by the scanner 38.

As is conventional, depending on the length of the document 32, the document 32 is folded within the folder 26. Upon being emitted from the folder 26, a scanner 48 of the invention detects the emergence of the folded document 32 as it passes on to the accumulator 28.

The accumulator 28 may be conventional, including an accumulation gate 50 for accumulating one or more of the folded documents 32, depending on the code 42 which has been read therefrom and stored within the micro processor 12. Similar to the gate 44, the gate 50 is controlled by the micro processor 12 and is positionable in one of two orientations, a document accumulation orientation and a document release orientation. A scanner 52 of the invention is employed at this point to determine the presence of a folded document 32 at the accumulation gate 50.

Documents released from the accumulator 28 pass onto the inserter track 30. Normally, documents are released from the accumulator 28 such that they are positioned between adjacent guides 54. The spacing between the guides 54 is exaggerated slightly in FIG. 3, spacing normally being just slightly larger than the width of a folded document 32, so that additional documents added downstream from the insert stacks 34 are properly aligned for insertion with the documents 32 into the envelopes 36.

Figure 4:
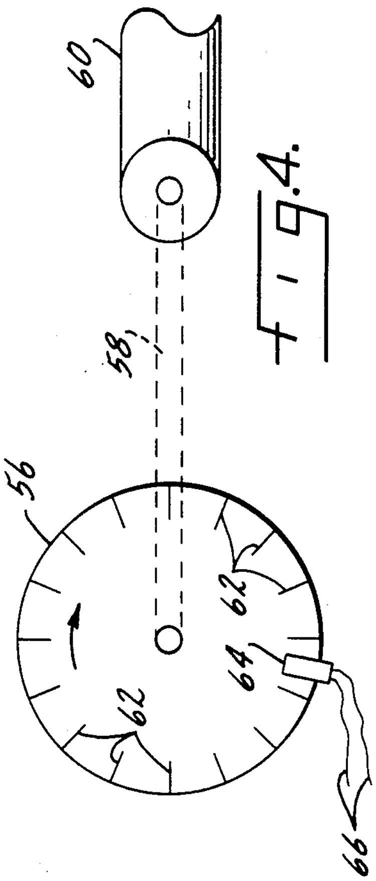
FIG. 4 is an enlarged view showing the rotary encoder employed by the invention.

As the code 42 is read from each of the documents 32 by the scanner 40 (and 41, if a double track code is read), it is preferable that the code be read in combination with pulses from a rotary encoder which is pulsing at the same rate as the spacing of the dash marks of the code 42. The combination of an encoder pulse and the presence of a dash mark on the document 32 is then sent to the micro processor 12 as an indication of a mark on the document 32, while the absence of a mark on the document 32 at the time that a pulse is generated by the rotary encoder signifies to the micro processor 12 the absence of a mark on the document 32. As shown in FIG. 4, the rotary encoder may be composed of a code disk 56 attached by means of a shaft 58 to a roller 60 of the conveyor 25. Therefore, as the roller 60 is rotated as the conveyor 24 is operated, the code disk 56 is rotated in unison.

The code disk 56 includes a series of equally spaced code marks 62 which, as explained above, are spaced the same distance as the locations of the dash marks of the code 42. The code marks 62 are read by a sensor 64 which generates a pulse each time one of the code marks 62 passes. Pulses from the sensor 64 are sent via wires 66 to the micro processor 12.

Shown in FIG. 3 in phantom form is a second document 32′ and the associated gate 44′ and scanners 38′, 40′, 41′ and 46′ in line with the document 32′. Depending on the nature of documents handled by the burster 22, a single line of documents, known in the industry as "one-up", or a dual line of documents, known as "two-up" can be handled by the processing system 10. While three or even more documents can be handled at one time, normally it is not necessary to do so. As shown in FIG. 3, the dual line of documents 32 and 32′ is collated in proper order at the accumulator 28, as is conventional.

In operation, documents 32 exit the burster 22 in a serial fashion. The burster 22 is controlled by the micro processor 12 so that only one document at a time is emitted onto the conveyor 25. When on the conveyor 25, a document 32 is detected by the scanner 38 and the code 42 is read by the scanner 40, in combination with the pulses from the code disk 56 read by the sensor 64. The code thus read is stored in the micro processor 12, which can be configured to recognize a certain number of received pulses and then ignore all subsequent code read from a document. The document 32 then proceeds to the gate 44, where the presence of the document 32 is detected by the scanner 46. If a folded document 32 is present at the accumulation gate 50, and if the code read from the folded document 32 is such that the document 32 on the conveyor 25 is not to be grouped with the folded document 32, the document 32 on the conveyor 25 is held temporarily at the retention gate 44. However, if the document 32 is to be grouped with one or more folded documents at the accumulation gate 50, the micro processor 12 opens the gate 44 to permit passage of the document 32. That sequence continues until the required number of documents, determined by the code 42 on the documents, is held at the accumulation gate 50.

When the required number of documents are collected at the accumulation gate 50, the micro processor 12 opens the gate 50 in synchronization with the inserter track 30 to permit the documents 32 to be placed between adjacent guides 54. Opening of the gate 50 also signals the micro processor 12 to open the gate 44 to permit any document 32 which is temporarily held to proceed through the folder 26 to the accumulation gate 50. Also, whenever a document 32 passes the retention gate 44, the burster 22 is activated to emit another document 32 on to the conveyor 25. Thus, the process continues, dependent entirely upon the code 42 read from each of the documents 32 as it passes the scanner 40. As the inserter track 30 proceeds, again depending upon the code read from the particular document or documents 32, the micro processor 12 causes inserts to be added from the insert stacks 34 to the document group. Finally, the document group is inserted within an envelope 36, the envelope 36 is sealed, and the envelope is handled downstream in a conventional manner.

Various changes may be made to the invention without departing from the spirit thereof or the scope of the following claims.

What is claimed is:

1. A system for identifying and sequentially arranging a plurality of coded documents traveling in a stream in an apparatus for processing and serially dispensing discrete groups of documents, comprising a. a source of coded documents, b. means for conveying documents individually from said source to a document release position, c. first scanner means along said conveying means positioned to determine the presence of a document, d. second scanner means associated with said first scanner means to read code from said document, e. processor means to store code read from each document, f. a retention gate at said document release position, said retention gate being positionable at one of two orientations comprising a document hold orientation and a document release orientation, g. third scanner means at said retention gate to determine the presence of a document at said gate, and h. a document accumulator spaced downstream from said document release position, said accumulator including i. an accumulation gate, and ii. fourth scanner means to determine the presence of a document at said accumulation gate.

2. A system according to claim 1 including encoding means for generating a pulse train, said encoding means being associated with said conveying means and generating pulses of said pulse train dependent upon the velocity at which said conveying means conveys said coded documents.

3. A system according to claim 2 in which said conveying means comprises a belt conveyor having a belt roller, and said encoding means comprises a rotary encoder attached to and rotatable with said roller and a sensor positioned adjacent said rotary encoder to detect code marks thereon and generate said pulses from said code marks.

4. A system according to claim 3 in which said rotary encoder includes a code disk having a plurality of equally spaced circumferential code marks.

5. A system according to claim 1 including fifth scanner means adjacent said second scanner means to read code from said document.

6. A system according to claim 1 in which said scanner means and said gates are connected to said processor means, said processor means including means to activate said gates response to code read from said document.

7. A system according to claim 1 in which said documents have a maximum length, and said retention gate is spaced downstream from said first scanner means at least said maximum length.

8. A system for identifying and sequentially arranging a plurality of documents bearing a dash code and traveling in a stream at least one document in width, said system comprising a portion of an apparatus for processing and serially dispensing discrete groups of documents, comprising a. a source of documents having a dash code aligned to be read rectilinearly,
b. means for conveying documents individually from said source to a document release position,
c. first scanner means along said conveying means positioned to determine the presence of a document,
d. second scanner means positioned to serially read the dash code on said document as said document passes thereby on said conveying means,
e. processor means to store code read from each document,
f. a retention gate at said document release position, said retention gate being positionable at one of two orientations comprising a document hold orientation and a document release orientation, and
g. a document accumulator spaced downstream from said document release position, said accumulator including
   i. an accumulator gate, and
   ii. third scanner means to determine the presence of a document at said accumulator gate.

9. A system according to claim 8 including fourth scanner means at said retention gate to determine the presence of a document at said retention gate.

10. A system according to claim 8 including a document folder located between said document accumulator and said document release position.

11. A system according to claim 10 in which documents folded by said folder have a maximum folded length, and said accumulator gate is spaced downstream from said folder at least said maximum folded length.

12. A process for indentifying and sequentially arranging a plurality of coded documents traveling in a stream in an apparatus including a source of the documents, a processor for storing and processing information, and a downstream conveyor for removing the documents after identification and arrangement, the process including the steps of a. conveying the documents individually from the document source to a document release position, and during such conveying
   i. scanning at a particular location to determine the presence of a document, and when the presence of a document is detected, sending an indication of the presence of the document to the processor,
   ii. after presence of a document is detected, reading code from the document for a particular length of time and storing the read code in the processor,
b. temporarily accumulating at least one document at a document accumulation position spaced downstream from the document release position,
c. scanning at the document accumulation position, and when the presence of a document is detected, sending an indication thereof to the processor,
d. comparing the stored code read from a document at the document accumulation position with the code read from the next succeeding document in the stream to determine if the next succeeding document is to be grouped with the document at the document accumulation position,
e. temporarily retaining the next succeeding document at the document release position if the next succeeding document is not to be grouped with the document at the document accumulation position,
f. releasing any document at the document accumulation position to the downstream conveyor, and
g. releasing any document at the document release position to proceed to the document accumulation position.

13. The process according to claim 12 including, before step "b", the step of folding the document.

14. The process according to claim 12 including the step of scanning at the document release position to determine the presence of a document at said position, and when the presence of a document is detected, sending an indication thereof to the processor.

* * * * *